United States Patent Office 2,781,539
Patented Feb. 19, 1957

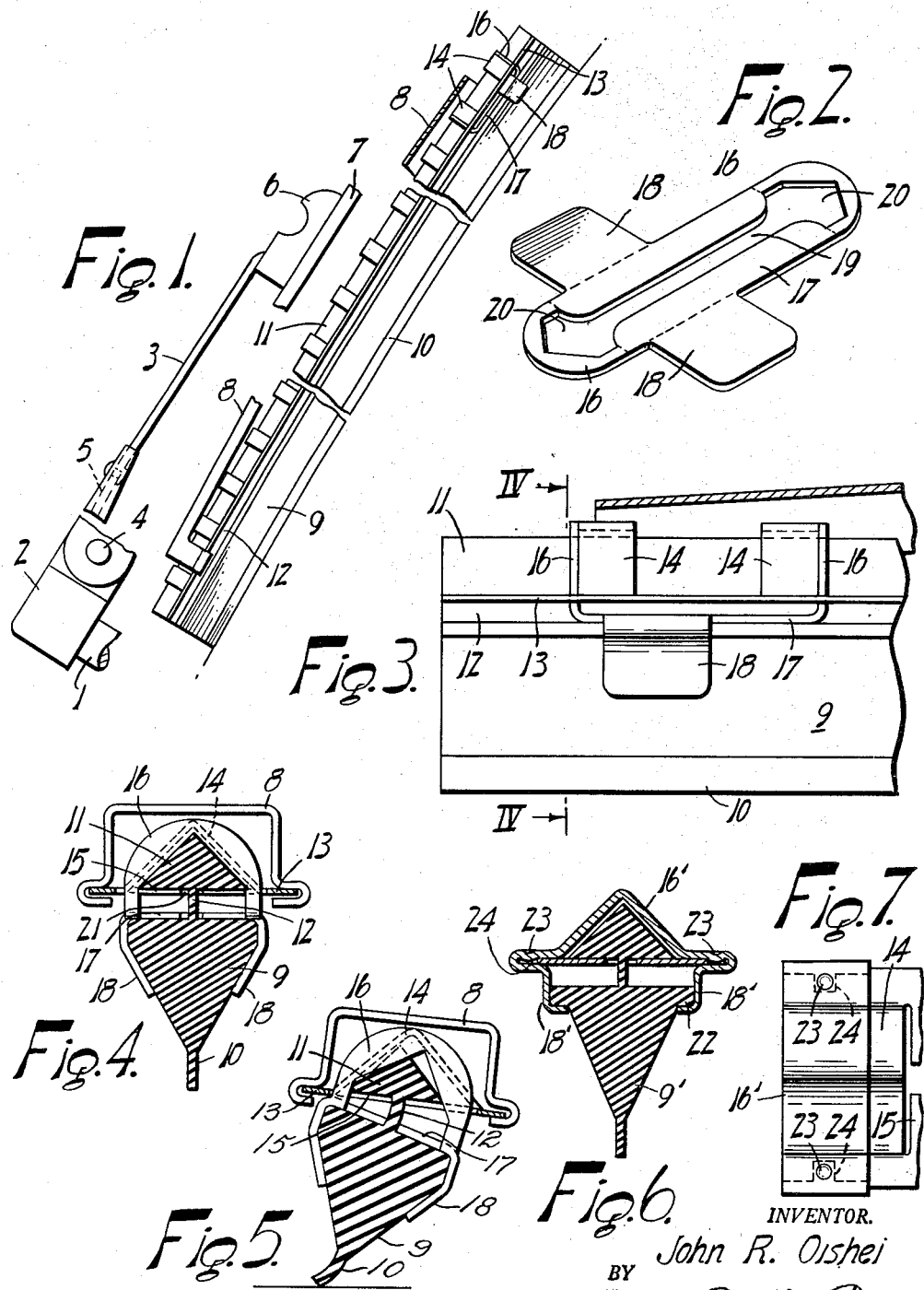

2,781,539

WINDSHIELD WIPER

John R. Oishei, Buffalo, N. Y., assignor to Trico Products Corporation, Buffalo, N. Y.

Application May 29, 1951, Serial No. 228,818

13 Claims. (Cl. 15—245)

This invention relates to the windshield cleaning art and more particularly to the wiping blade which is automatically oscillated on the windshield surface to maintain a clear field of vision therethrough during inclement weather.

The curved windshield of the present day automobile is cleaned by a flexible wiper that is self-conforming to the varying contour of the windshield surface, and in order to obtain this self-conformance the rubber squeegee element is formed with a very flexible hinge suspension for its body portion by which the latter may rock upon its wiping edge at the start of a stroke to assume the desired dragging position for the best performance of its wiping function. By reason of such hinge suspension the body portion of the squeegee member is more readily conformed to the curvature of the surface. The hinge suspension is in the form of a thin neck that joins the body portion to an anchoring head, and when the wiper is moved back and forth over a surface the neck will flex from side to side to so present the wiping edge or lip for such wiping performance.

The wiping lip is itself flexible and, being molded from a soft rubber, is subject to clinging to the surface, such clinging becoming much more pronounced on a partially wet, sometimes referred to as a wet-dry, surface. The adhesion causes an abnormal pull on the wiping lip which is transmitted through the flexing neck to the anchorage, tending to dislodge the anchoring head from its flexible metal holder or backing. In fact, the tug upon the neck is so severe at the outer end of the wiping blade, which portion has the greatest sweep, that the neck is ruptured and torn from its anchorage. Under such condition, the severed underlying body portion of the squeegee member will then drag from under its holder and allow the latter to come into scratching contact with the glass surface to mar it and thereby impair the field of vision.

The present invention has for its main object to provide a wiper which will preclude such vision impairment by effectively supporting the squeegee member against rupture under severe strains.

Further, the invention has for its object to provide an improved wiper for curved windshields which has the desired flexibility for surface conformance while being protected against the failure of the squeegee member and the consequential disastrous results to the windshield.

The invention further has for its object to provide a wiper which is simple and practical in construction and also is efficient in operation on either flat or curved surfaces.

The foregoing and other objects will manifest themselves as this description progresses, reference being made therein to the accompanying drawing wherein Fig. 1 is a side elevation showing the application of the present invention, parts being broken away;

Fig. 2 is a plan view of the stirrup blank;

Fig. 3 is a fragmentary enlargement in side elevation more clearly showing the stirrup in position;

Fig. 4 is a cross sectional view about on line IV—IV of Fig. 3;

Fig. 5 is a similar view showing the wiper in operation;

Fig. 6 is a view similar to Fig. 4 through a modified embodiment; and

Fig. 7 is a fragmentary top plan view of such modified wiper.

Referring more particularly to the accompanying drawing, the numeral 1 designates an oscillatory shaft, 2 the mounting inner section of a wiper arm fixed thereon, 3 the wiper carrying outer section of the arm which is hinged to the fixed inner section by a pivot pin 4 and is placed under a resilient urge by a leaf spring 5, all in a well known manner.

The outer end of the wiper arm 2, 3, is connected to a clip or coupler 6 on a primary yoke 7, which in turn has its opposite ends connected through secondary yokes 8 to the elongate flexible backing or holder for a squeegee member. The squeegee member has a body portion 9 with a thin wiping edge or lip 10 projecting along one margin and an anchoring bead or head 11 joined to its opposite margin by a reduced neck 12 that enables the body with its wiping edge to conform to the surface curvature and to hinge or swing laterally from the line of anchorage for assuming a dragging position during the wiping stroke. The flexible backing is in the form of a single piece sheet metal stamping having side rails 13 joined by cross straps 14 that arch over the anchoring head while opposed sets of fingers 15 extend inwardly from the rails to engage beneath the head, all as is more fully set forth in copending application Serial No. 161,086.

The rubber material of which the squeegee member is made is soft and pliable for being readily conformed to the windshield surface by the arm-applied pressure as distributed by the yokes and the flexible backing. Preferably, this rubber, whether natural or synthetic, has a cling characteristic which will enable the wiping edge clinging to the windshield surface for more effectively peeling off and removing any vision-blurring film that is frequently found thereon when the wiper is first used following a dry spell. While the cling factor is desirable in the wiping contact for cleaning a thoroughly wet surface, it does produce an objectionable tenacious hold on a partially wet or wet-dry surface that places a severe strain upon the thin neck and a heavy tug upon the anchorage. This is the more noticeable at the outer end of the oscillating wiper where the sweep is the greatest and the speed is the fastest. Under such abnormal condition the neck is more likely to rupture and drop the metal holder down onto the windshield glass, with irreparable damage resulting.

According to the present invention, means are provided to give adequate end-support to the squeegee body to prevent the neck rupturing while affording the desired freedom of movability thereof for an efficient wiping operation. For this purpose, there is provided a supporting stirrup for the outer end of the squeegee member. In its practical design, the stirrup may be shaped from a sheet metal blank, Fig. 2, to form spaced hangers 16 and an intermediate body-grasping portion comprising a seat 17 for the body 9 and body-embracing fingers 18. The blank is provided with a slot 19 having terminal enlargements 20 which latter afford entranceways for the anchoring head when threading the neck through the slot 19.

When assembling the wiper or blade components, the rubber body is threaded through the longitudinal slot 21 of the holder, as defined by the fingers 15, with the anchoring head entering beneath the arched cross straps 14. Preliminary to this, however, the stirrup 16, 17, 18 is positioned on the flexible holder with the slot 19 registering with the holder slot 21, and with the enlargements 20 in registry with the holder channel as formed by cross straps 14. Therefore, when the squeegee or rubber blade body has been threaded into its proper position in the holder, the stirrup also will thereby be secured to the holder at the same time. Preferably, the length of the stirrup may be sufficient to bridge two or more of the cross straps 14, as suggested in Fig. 3, the hangers 16 abutting the straps, with the enlargements 20 snugly fitting the anchoring head to constitute a means of frictional securement for the squeegee member against longitudinal displacement from the holder.

Being supported by the resilient anchoring head, the stirrup is given a yielding suspension which affords a limited freedom of movement of the body portion 9 and the stirrup as a unit but is restricted against excessive neck-strain. Consequently, the wiper has its normal freedom of surface-conforming flexure but is protected from breaking under abnormal strain. Two or more stirrups may be utilized throughout the length of the wiper, although it is thought that a single one located at the outer end of the wiper will suffice since that is the point of greatest strain and where the rupture or tear is most likely to occur.

In the modified showing of Figs. 6 and 7, the hanger part 16' of the stirrup is fixed to the flexible backing, in lieu of being resiliently connected thereto through the squeegee, and has depending fingers 18' loosely engaging beneath shoulders 22 on the squeegee member. This permits the squeegee body 9' to yield and rock within the limitations provided by the stirrup, which latter is suitably secured to the holder, as by striking a lug 23 from the stirrup into a recess 24 in the side rail 13' of the holder.

In both physical embodiments, the loosely supported neck is protected from being unduly stretched, and therefore the squeegee body remains unimpaired for supporting the holder from scratching contact with the curved windshield surface. The body portion 9, 9' is given a yielding support to cushion its arrest short of a neck rupture.

The foregoing description has been given in detail for clarity and ease of understanding and without thought of limitation since the inventive principles involved are capable of assuming other physical embodiments without departing from the spirit of the invention and the scope of the appended claims.

What is claimed is:

1. A windshield wiper comprising a blade body having a relatively thin wiping edge along one margin and an anchoring head along its opposite margin joined to the body by a reduced neck, a surface conforming flexible backing strip having longitudinal side margins, and a pressure applying superstructure operatively engaging the latter, said backing strip having opposed portions extending lengthwise of and engaging beneath and supporting the anchoring head at opposite sides of the neck, and a secondary supporting member extending over the head and interlocking with the opposed portions at opposite sides of the neck, said secondary supporting member extending thence downwardly to straddle the body in engagement therewith to afford lateral support therefor beneath the backing strip.

2. A windshield wiper comprising a flexible elongate blade body having an anchoring portion along one longitudinal margin hingedly supporting a body portion with a relatively thin wiping edge along its opposite margin, a surface conforming flexible backing having opposed parts engaged with the anchoring portion to support the same, and a secondary supporting member interlocked with the flexible backing and having laterally spaced body embracing fingers depending below the backing strip and straddling the underlying body portion, said fingers extending in supporting contact with the opposite side faces of the body above the wiping edge.

3. A windshield wiper comprising an elongate flexible holder, a flexible squeegee member having an elongate body with a wiping edge along one margin and an anchoring bead along its opposite margin, the anchoring bead being supported by the holder and joined to the body by a reduced neck, and a body-suspending stirrup carried by the holder and having opposed parts bridging the neck and straddling the body therebeneath in supporting contact with the opposite sides thereof to relieve the neck of rupturing strain.

4. A windshield wiper comprising an elongate body having a relatively thin wiping edge along one margin and an anchoring bead along its opposite margin joined to the body by a reduced neck, an elongate holder engaging beneath the anchoring bead to drag the wiper back and forth across a surface, and a stirrup fixed to the holder and having opposed fingers straddling the body and extending inwardly toward each other in supporting contact therewith.

5. A windshield wiper comprising an elongate body having a relatively thin wiping edge along one margin and an anchoring bead along its opposite margin joined to the body by a reduced neck, an elongate holder engaging beneath the anchoring bead to drag the wiper back and forth across a surface, and a stirrup carried by the anchoring bead and having body embracing fingers grasping the body for moving therewith as a unit to such dragging position and supporting the body against a neck-rupturing strain.

6. An oscillatory windshield wiper comprising a flexible squeegee member having an elongate swingable body with a wiping edge along one margin and an anchoring bead along its opposite margin joined thereto by a reduced neck, a channeled holder loosely embracing the anchoring bead, and a body-suspending stirrup at the outer end of the holder having spaced hangers receiving the anchoring bead with a snug fit, said stirrup supportingly grasping the body beneath the reduced neck to relieve the latter of a neck-breaking strain of the faster-moving end of the wiper.

7. A windshield wiper comprising a blade body having a relatively thin wiping edge along one margin and an anchoring bead along its opposite margin joined to the body by a reduced neck, a channeled holder receiving the anchoring bead and having parts engaging therebeneath to retain the bead therein and therefrom to suspend the body for lateral swinging, and a strain-relieving stirrup spanning the neck and supporting the body beneath the neck and having a hanger suspended from the anchoring bead to give it resilient support.

8. A windshield wiper comprising a blade body having a relatively thin wiping edge along one margin and an anchoring bead along its opposite margin joined to the body by a reduced neck, a holder having side rails connected by arched cross straps, and a stirrup engaged with the body beneath the neck and having upstanding hangers suspending from the anchoring bead between the straps.

9. A windshield wiper comprising a blade body having a relatively thin wiping edge along one margin and an anchoring bead along its opposite margin joined to the body by a reduced neck, a holder having side rails connected by arched cross straps receiving the anchoring bead, parts from the side rails extending beneath the anchoring bead to retain it loosely in the arched cross straps, and a stirrup engaged with the body beneath the neck and having upstanding hangers formed with openings conformably receiving the anchoring bead, said anchoring bead being threaded through the hanger openings and above the retaining parts to yieldably attach the stirrup to the holder adjacent the cross straps.

10. A windshield wiper comprising a blade body having a relatively thin wiping edge along one margin and an anchoring bead along its opposite margin joined to the body by a reduced neck, a holder having side rails connected by arched cross straps, and a stirrup having a hanger part fixed to the holder and depending fingers loosely embracing the body to enable the body to rock laterally and to restrain it from abnormal neck-straining movement.

11. A windshield wiper comprising a blade body having a relatively thin wiping edge along one margin and an anchoring bead along its opposite margin joined to the body by a reduced neck, a holder having side rails connected by arched cross straps receiving the anchoring bead, parts from the side rails extending beneath the anchoring bead to retain it loosely in the arched cross straps, and a stirrup engaged with the body beneath the neck and having upstanding hangers formed with openings conformably receiving the anchoring bead, said anchoring bead being threaded through the hanger openings and above the retaining parts to yieldably attach the stirrup to the holder, said upstanding hangers abutting the cross straps to interlock the anchoring bead with the holder.

12. A windshield wiper comprising a blade body having a relatively thin wiping edge along one margin and an anchoring bead along its opposite margin joined to the body by a reduced neck, a surface conforming flexible holder supporting the anchoring bead, and body engaging means bridging the neck and supporting the body beneath the neck, said body engaging means being carried by the flexible holder to flex therewith.

13. A windshield wiper comprising a flexible elongate blade body having an anchoring portion along one longitudinal margin hingedly supporting a body portion with a relatively thin wiping edge along its opposite margin, a surface conforming flexible backing engaged with the anchoring portion, and laterally spaced body-embracing fingers bridging the hinge and extending in supporting contact with the opposite side faces of the body to hold the body against abnormally straining the hinge, said fingers engaging under the body at points above the wiping edge.

References Cited in the file of this patent

UNITED STATES PATENTS

| 592,076 | Brown | Oct. 19, 1897 |
| 1,628,783 | Jensen | May 17, 1927 |
| 2,085,608 | Rodrick | June 29, 1937 |
| 2,086,453 | Ward | July 6, 1937 |
| 2,105,021 | Walton | Jan. 11, 1938 |
| 2,230,583 | Borden | Feb. 4, 1941 |
| 2,596,063 | Anderson | May 6, 1952 |

FOREIGN PATENTS

| 835,410 | Germany | July 8, 1949 |

OTHER REFERENCES

Publication of Anderson Co., Gary, Ind., Nov. 1, 1946, pages 2 and 3.